UNITED STATES PATENT OFFICE.

AUGUST LEOPOLD LASKA, OF OFFENBACH-ON-THE-MAIN, GERMANY, ASSIGNOR TO CHEMISCHE FABRIK GRIESHEIM - ELEKTRON, OF FRANKFORT-ON-THE-MAIN, GERMANY, A CORPORATION.

BLACK MORDANT DYE AND PROCESS OF MAKING SAME.

No. 839,489.     Specification of Letters Patent.     Patented Dec. 25, 1906.

Application filed August 2, 1906. Serial No. 328,905.

*To all whom it may concern:*

Be it known that I, AUGUST LEOPOLD LASKA, doctor of philosophy, chemist, a resident of 5 Gerberstrasse, Offenbach-on-the-Main, in the Grand Duchy of Hesse, German Empire, have invented new and useful Improvements in Black Mordant Dyes and Processes of Making Same, of which the following is a specification.

My invention relates to the production of mordant azo dyes, which may be obtained by combining the 1:2 diazonaphthol 4 sulfonic acid with meta-oxydiphenylamin derivatives of the general formula

wherein X means H or $CH_3$.

In order to obtain the coloring-matter in a good yield, it is necessary to use for the combination concentrated solutions of the diazo compound and the oxydiphenylamin. The quantity of alkali may be varied within wide limits. The thus obtained dyestuffs dye wool in an acid-bath black-violet shades, which by subsequent treatment with a bichromate are converted in a dark reddish black, showing very good fastness in all respects.

In the following example I shall illustrate the nature of my invention and how it may be carried out, parts being by weight and degrees referring to the centigrade scale: Sixty parts of the 1:2 amidonaphthol 4 sulfonic acid are suspended in one hundred and fifty parts of water. Thirty-five parts of sodium acetate are added and diazotized at about 5° by the addition of eighteen parts of sodium nitrite. After stirring for four hours diazotizing is completed. The diazo solution is then poured into a solution of forty-nine parts of metaoxydiphenylamin in two hundred parts of water containing thirty-five parts of caustic-soda lye, 35° Baumé, and eighty-three parts of sodium carbonate. The combining begins at once and the solution shows a dark-blue color when the reaction is completed. Twenty-four hours afterward the temperture is raised to 80° and the dyestuff precipitated by neutralizing the excess of alkali by means of hydrochloric acid. Instead of sodium carbonate any other alkali may be used. In the above-mentioned example, for instance, one hundred and sixty parts of caustic-soda lye can be employed.

The two components have such an ability of combining that the formation of dyestuff takes place even in solutions containing no excess of alkali. Therefore the dyestuff can be prepared by pouring a solution of the diazo compound obtained from one molecule of the 1:2 diazonaphthol 4 sulfonic acid by means of one molecule of sodium nitrite into a solution of one molecule sodium salt of metaoxydiphenylamin. The combining may be carried out in the same manner with methyl-oxydiphenylamin of the formula:

wherein the $CH_3$ group may be in ortho-, meta-, or para position to the NH group. The thus-obtained dyestuffs are black-brown powders soluble in concentrated sulfuric acid with violet to bluish-violet shades, soluble in water with violet shades, which are converted into more bluish tints by addition of sodium carbonate and in more reddish ones by addition of caustic-soda lye. This coloring-matter dyes wool in an acid-bath black-violet shades, which are converted by subsequent treatment with a bichromate in a reddish black, showing very good fastness in all respects.

Now what I claim, and desire to secure by Letters Patent, is the following:

1. The manufacture of mordant azo dyestuffs by combining in concentrated solutions the 1:2 diazonaphthol 4 sulfonic acid with oxydiphenylamin derivatives of the general formula

wherein X means H or $CH_3$.

2. The new mordant azo dyestuffs obtainable by combining the 1:2 diazonaphthol 4 sulfonic acid with oxydiphenylamin bodies of the formula

in concentrated solutions, which coloring-matter is a black-brown powder, soluble in concentrated sulfuric acid with violet to bluish-violet color, soluble in water with violet color, which color is rendered more bluish by addition of sodium carbonate, and more reddish by addition of caustic-soda lye; dyeing wool in an acid-bath black-violet tints which are converted in reddish-black shades by a subsequent treatment with a bichromate.

In testimony that I claim the foregoing as my invention I have signed my name, in presence of two witnesses, this 23d day of July, 1906.

AUGUST LEOPOLD LASKA.

Witnesses:
 EVA SATTLER,
 OSKER STANDHOARDT.